United States Patent
Bruhn

[19]

[11] Patent Number: 5,952,763

[45] Date of Patent: Sep. 14, 1999

[54] BRUSH HOLDER PLATE

[75] Inventor: Rainer Bruhn, Ingersheim, Germany

[73] Assignee: ITT Manufacturing Enterprises, Inc., Del.

[21] Appl. No.: 09/065,084

[22] PCT Filed: Nov. 12, 1996

[86] PCT No.: PCT/EP96/04943

§ 371 Date: Feb. 12, 1998

§ 102(e) Date: Jun. 12, 1998

[87] PCT Pub. No.: WO97/19502

PCT Pub. Date: May 29, 1997

[30] Foreign Application Priority Data

Nov. 18, 1995 [DE] Germany ............................ 195 43 125

[51] Int. Cl.$^6$ .................................................. H01R 39/38
[52] U.S. Cl. ........................... 310/238; 310/239; 310/71; 310/249; 310/248
[58] Field of Search .................................. 310/238, 239, 310/71, 249

[56] References Cited

U.S. PATENT DOCUMENTS

| 4,329,605 | 5/1982 | Angi et al. ............................ 310/68 R |
| 4,398,135 | 8/1983 | Busch et al. ............................ 318/443 |
| 4,851,730 | 7/1989 | Fushiya et al. .......................... 310/249 |
| 5,227,685 | 7/1993 | Krouse ..................................... 310/71 |
| 5,414,318 | 5/1995 | Shimizu et al. ......................... 310/239 |

FOREIGN PATENT DOCUMENTS

| 2914853 | 10/1980 | Germany . |
| 8427601 | 5/1985 | Germany . |
| 3123517 | 4/1987 | Germany . |
| 3632594 | 4/1988 | Germany . |
| 3921889 | 1/1990 | Germany . |
| 3629634 | 11/1990 | Germany . |
| 9401343 | 3/1994 | Germany . |
| 9401343 | 4/1994 | Germany . |
| 2079540 | 1/1982 | United Kingdom . |

Primary Examiner—Nestor Ramirez
Assistant Examiner—Thanh Lam
Attorney, Agent, or Firm—J. Gordon Lewis

[57] ABSTRACT

A brush holder plate includes plugs with a blade terminal and an extension connected thereto. The plugs with their extension are inserted from below into the brush holder plate which is provided with sleeves on its top surface. The extension is passed through the sleeve, and a strand is slipped from the other side into the sleeve. An electrical connection between the strand and the plug is produced by pinching the sleeve, on the one hand, and the plug is fixed mechanically on the brush holder plate, on the other hand.

8 Claims, 2 Drawing Sheets

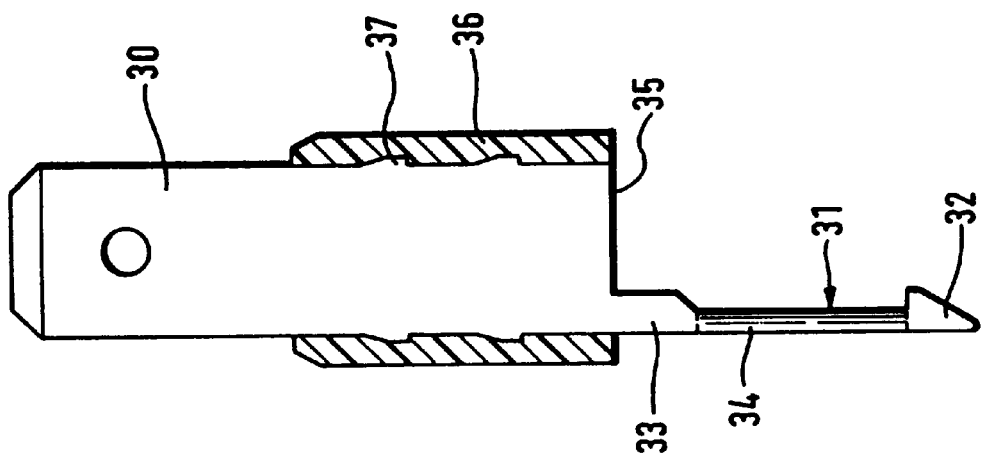
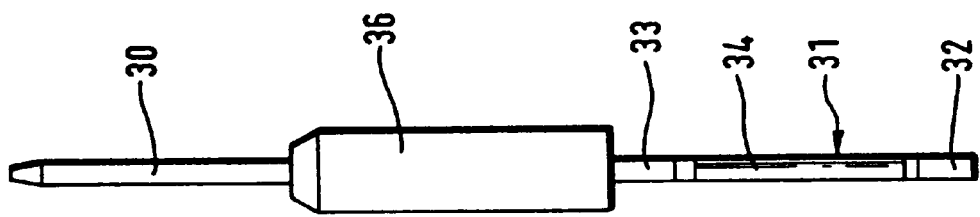
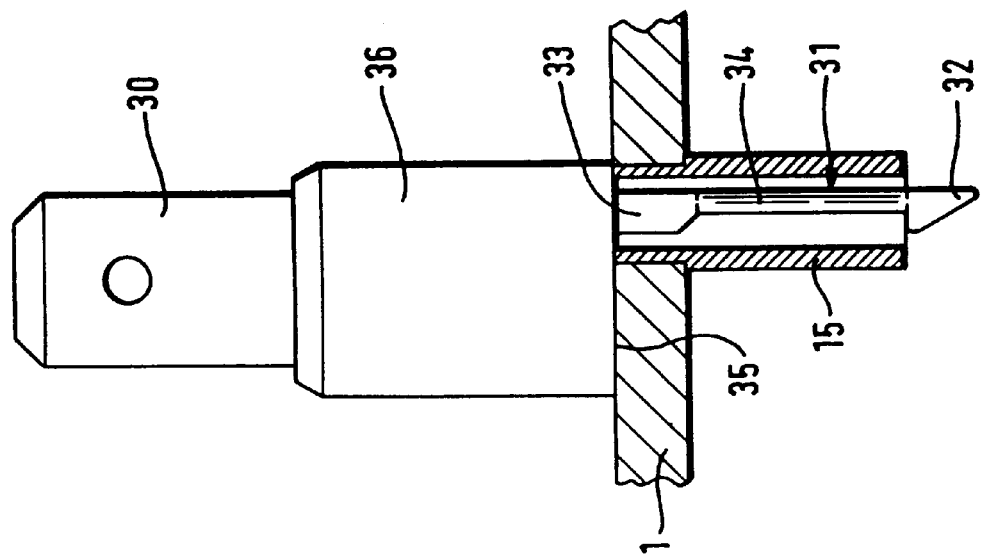

BRUSH HOLDER PLATE

BACKGROUND OF THE INVENTION

The present invention relates to a brush holder plate. The plate includes guides wherein brushes are guided. The guides may be casings folded from sheet metal and mounted onto the top surface of the brush holder plate. However, there are also known brush holder plates wherein the guides are provided in the plate itself.

Frequently, the brush holder plates include connector plugs to provide an electrical connection between the brushes and outside terminals.

An object of the present invention is to provide an attachment for plugs of this type which is as simple as possible, easy to mount and ensures a reliable electrical connection between the brushes and the plugs.

SUMMARY OF THE INVENTION

To this effect, contact pins which project vertically from the top surface of the brush holder plate are reliably retained on the holder plate by pinching the sleeves. Also, there is the possibility of inserting the strands to be connected to the plug, prior to the pinching operation, from above into the sleeves so that along with the pinching operation an electrical connection between the contact pins and the brushes is produced.

To fix the contact pins axially in position on the brush holder plate, an extension of the plug is provided with a barb which extends over the upper end of the sleeve. Additionally, a rearward stop edge moves to bear against the bottom side of the brush holder plate. The distance between the stop and the barb corresponds roughly to the longitudinal extension of the hole and the sleeve so that the plug, after the sleeve is pinched, is attached to the brush holder plate so as to be secured in both axial directions.

Because the brush holder plate which is generally made of plastic material is mounted onto a bearing plate made of steel and is generally grounded, the plug 20 has a plastic cup seal in the area which extends through the bearing plate. The plastic seal may additionally be used as a counterpiece for the counterplug to be mounted onto the plug.

The present invention will be explained in detail by way of five Figures.

BRIEF DESCRIPTION OF THE INVENTION

In the drawings,

FIGS. 3a–3c show a top view, a side view and a cross-sectional view of a contact pin.

DETAILED DESCRIPTION OF THE INVENTION

Figure 1:
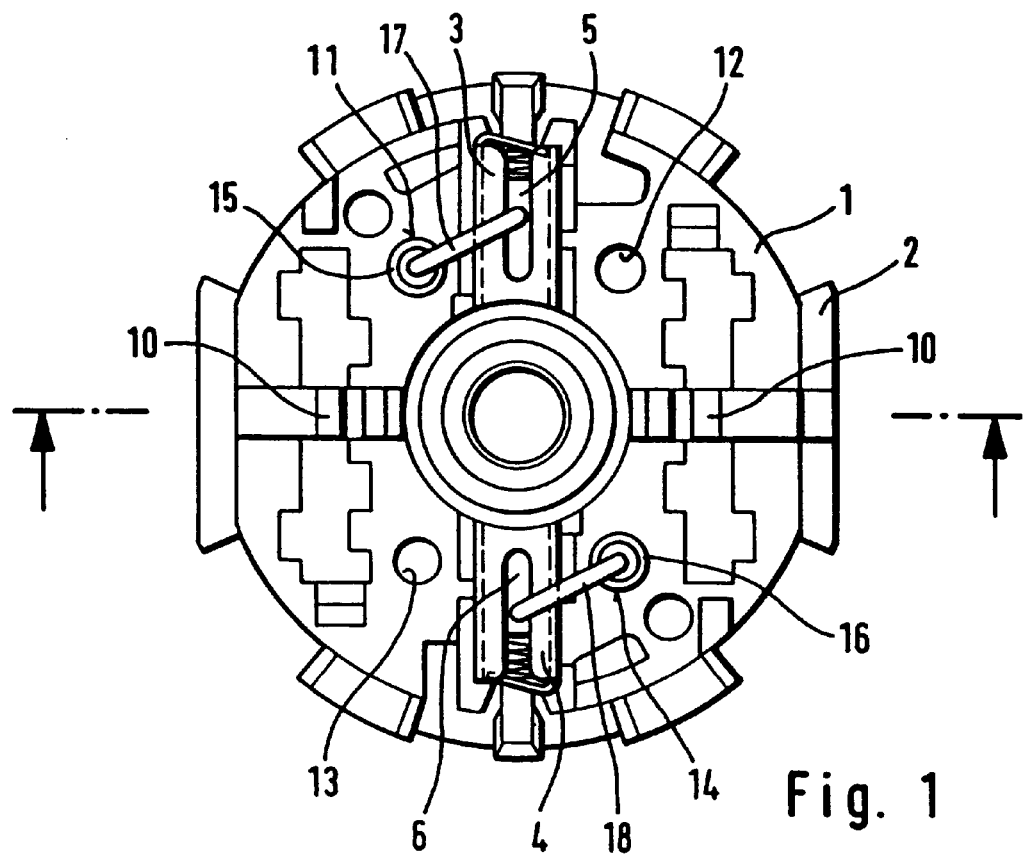
FIG. 1 is a top view of a brush holder plate.

FIG. 1 shows a plastic brush holder plate 1 which is mounted onto a bearing plate 2. On the side of the brush holder plate 1 remote from the bearing plate 2, two casings 3, 4 are attached in which brushes 5 and 6 are guided. The casings 3, 4 are aligned towards a central aperture in the brush holder plate 1 through which the motor axis with a collector extends.

The brushes 5 and 6 are provided with strands 17, 18 which are used for the current supply.

Figure 2:
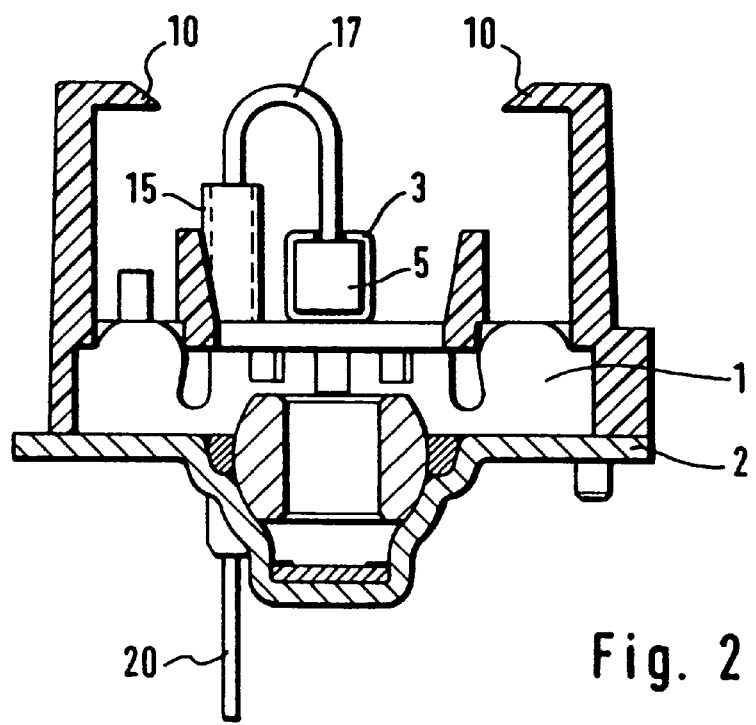
FIG. 2 is a cross-section taken through a brush holder plate.

As can be seen in the cross-section of FIG. 2, the brush holder plate includes mounting hooks 10 which are used to retain electric components, such as anti-interference coils, on the brush holder plate.

Several holes 11, 12, 13, 14 are provided in the brush holder plate on which sleeves 15, 16 are partly inserted. The sleeves project vertically from the plane of the brush holder plate, as can be seen in FIG. 2. The sleeves are realized by so-called tubular rivets.

The sleeves, among others, are used as joints to connect the strands 17, 18 of the carbon brushes with connecting wires of the other electronic structural elements. To this effect, the wires or strands to be connected are either welded to the sleeves, or slipped into them, and an electrical connection is produced by pinching and/or welding the sleeve.

As will be explained in the following, the additional objective of the sleeves of the present invention is to establish connections to contact pins 20 by which the motor is supplied with current from outside the system. The contact pins 20 (one of which is shown in FIG. 2) are slipped into the sleeve over part of their length. Subsequently, the sleeve is pinched, whereby a reliable connection of the sleeve 15 with the contact pin 20 and, simultaneously, an electrical connection to a strand 7 of a carbon brush 5 is established.

An appropriate contact pin is shown in FIGS. 3a–3c. FIG. 3a shows a top view, FIG. 3b a side view, and FIG. 3c is a cross-sectional view of a contact pin 20.

The contact pin 20 is a blade terminal 30 having a connecting piece 31 provided in the extension of a longitudinal edge. The connecting piece 31 terminates into a barb 32 and, following the blade terminal 30, includes a flat area 33 which passes over into a round area 34.

The flat area 33 in its longitudinal extension corresponds roughly to the thickness of the brush holder plate 1, and the round portion 34 in its longitudinal extension corresponds roughly to the height of the sleeve, as is shown schematically in FIG. 3a.

A rearward rim 35 of the blade terminal 30 is an end which comes to bear against the bottom side of the brush holder plate 1 when the contact pin 20 is inserted from below into the brush holder plate.

The backward area of the blade terminal 30 is encompassed by a plastic cup seal 36, and the forwardly projecting area of the blade terminal 30 is used as a contactor. The plastic cup seal 36 ends flush with the rear rim 35 of the blade terminal 30. To prevent the plastic cup seal 36 from displacing onto the blade terminal 30, noses 37 are provided on the lateral edge of the seal. This can clearly be seen in the cross-sectional view in FIG. 3c.

The brush holder plate 1 is mounted on a bearing plate 2, as can be seen in FIG. 2. The bearing plate includes apertures through which the contact pins 20 extend to the brush holder plate 1. The size of the apertures corresponds to the outside contour of the plastic cup seal 36.

In the assembly, initially, the contact pin 20 is inserted from below through one of the holes 11, 12, 13, 14 which include a sleeve 15, 16 so that the rim 35 abuts the bottom side of the brush holder plate and the connecting piece 31, especially the round portion 34 thereof, extends into the sleeve 15 connected to the respective hole in the brush holder plate. Thereafter, the strand of the brush being connected is inserted from the top into the sleeve. Subsequently, the sleeve is pinched so that an electrical connection is produced between the strand 17, 18 and the blade terminal 30. The barb 32 extends beyond the upper edge of the pinched sleeve and effectively prevents the plug pin from being drawn off downwardly. Thus, the plug is fixed axially by the barb, on the one hand, which grips over the upper edge of the sleeve, and by the rim 35, on the other hand, which bears against the bottom side of the brush holder plate.

Thereafter, the preassembled unit is mounted onto the bearing plate, and the blade terminals 30 are passed through corresponding recesses in the plate.

I claim:

1. A brush holder plate which includes casings to guide carbon brushes having strands, and electric contact pins which project from one side of the brush holder plate, wherein the brush holder plate has holes and sleeves adapted to be pinched and projecting from the holes in the brush holder plate, and wherein the contact pins have extensions which are passed through the holes and the sleeves, and wherein a connection between the contact pins and the sleeves is produced by pinching the sleeves.

2. A brush holder plate as claimed in claim 1, wherein the strands are inserted into the sleeves, and wherein an electrically conductive connection between the contact pins and the strands is produced by pinching and/or welding.

3. A brush holder plate as claimed in claim 1, wherein the extensions include barbs extending over the ends of the pinched sleeves so that the contact pins are secured axially in position this way.

4. A brush holder plate as claimed in claim 1, wherein the contact pins have a blade terminal ending in a rearward rim which moves into abutment with the bottom side of the brush holder plate.

5. A brush holder plate as claimed in claim 1, wherein the contact pins include blade terminals, and connecting pieces are provided in extensions of edges of the blade terminals.

6. A brush holder plate as claimed in claim 5, wherein the connecting pieces include round portions.

7. A brush holder plate as claimed in claim 5, wherein the blade terminals have rearward rims and rearward areas with plastic cup seals which end flush with the rearward rims.

8. A brush holder plate as claimed in claim 1, wherein the brush holder plate is mounted on a bearing plate, and apertures for the contact pins are provided in the bearing plate.

\* \* \* \* \*